United States Patent [19]
Roelofs et al.

[11] 3,852,419
[45] Dec. 3, 1974

[54] TRANS-8-TRANS-10-DODECADIEN-1-OL AS AN ATTRACTANT

[76] Inventors: Wendell Roelofs, 652 W. North St., Geneva, N.Y. 14456; Andre Comeau, 1082 Principal, Richmond, Quebec, Canada; Ada Hill, 575 White Springs Rd., Geneva, N.Y. 14456

[22] Filed: Nov. 13, 1972

[21] Appl. No.: 306,233

Related U.S. Application Data

[62] Division of Ser. No. 136,692, April 23, 1971, abandoned.

[52] U.S. Cl. ............................... 424/84, 424/343
[51] Int. Cl. ................................... A01n 17/14
[58] Field of Search ........................... 424/84, 343

[56] References Cited
OTHER PUBLICATIONS

Roelofs et al., Science, Vol. 174, pp. 297–299, Oct. 15, 1971.
Chemical Abstracts, Vol. 73, item 32746W (1970) and Vol. 74, item 73438M (1971).

*Primary Examiner*—Sam Rosen
*Attorney, Agent, or Firm*—Omri M. Behr

[57] ABSTRACT

Trans-8-trans-10-dodecadien-1-ol has been synthesized and found to be a sex attractant for males of the species *Laspeyresia pomonella*. (codling moth), a major pest of the apple. A method of preparing trans-8-trans-10-dodecadien-1-ol and a method of utilizing said compound as attracting agent are disclosed.

2 Claims, No Drawings

TRANS-8-TRANS-10-DODECADIEN-1-OL AS AN ATTRACTANT

This is a division of application Ser. No. 136,692 filed Apr. 23, 1971, and now abandoned.

FIELD OF THE INVENTION

Novel insect sex attractants.

DESCRIPTION OF THE PRIOR ART

In recent years, the ecological problems raised by the wide-spread use of certain insecticides, in particular halogenated aromatics such as DDT, have initiated the search for more specific methods of destroying insect pests, which, if they do not entirely eliminate the use of such harmful insecticides as pesticides, at least considerably cut down the area in which they are broadcast. One mode which has been found of great interest in recent years has been the use of sex attractants or pheromones to attract either the male or the female of a particular species or a number of species to a particular and small location where they can be destroyed thereby interrupting the breeding cycle and cutting down the number of such pests in the next season. One technique employed for this purpose is to isolate either the male or the female pheromone and insert it into an insect trap which is then located in the area which it is desired to protect from a particular species of moth or other insect. The vapor from the trap attracts the insects into the trap where they are either held or killed, thus removing them from the general populace. Two problems have been associated with this approach. The first problem is that of availability. Enormous numbers of laboratory reared insects are required to produce the naturally occurring attractant. This clearly is not a commercially feasible approach and therefore the nature of the attractant must be determined and the attractant prepared synthetically.

Several workers have attempted to isolate and identify the pheromone present in the female sex pheromone gland of L.pomonella. (Barnes et al, *Ann Ent. Mol. Soc.* 59 732 (1966), Butt and Hathaway, *J. Econ. Entom.* 59 476 (1966), McDonough et al. *J. Econ. Entom.* 62, 62, (1969). These authors refer to the moth as Carpocapsa pomonella (L), it is however the same species considered in the present invention). Beyond the finding that the active compound contains an alcohol group, heretofore there has been no unequivocal identification of the male attracting pheromone.

SUMMARY OF THE INVENTION

A male attracting compound which is active towards males of the species L.pomonella, namely trans-8-trans-10-dodecadien-1-ol has been synthesized, and found active in both in vitro and in vivo tests.

The corresponding cis-trans, trans-cis, and cis-cis conformational isomers have been prepared and found to elicit a substantially lower response in in vitro electroantennogram tests.

The codling moth (L.pomonella) is an extremely serious pest of the apple, and therefore, the finding of a male attractant compound for this insect is of great utility in providing ecologically desirable methods of reducing the population of this insect without the necessity of large scale spraying which is required at the present time.

DESCRIPTION OF THE PREFERRED EMBODIMENTS

A route is disclosed for the synthesis of trans-8-trans-10-dodecadien-1-ol. There are also disclosed methods of preparing the relatively inactive cis-trans, trans-cis, and cic-cis isomers thereof. It should be noted however, that the active isomer is thermodynamically the more stable isomer, and therefore the other isomers are convertible thereto. While methods of preparing the nonpreferred isomers are disclosed, it is preferred to prepare the active desired isomer directly rather than via the inactive compounds.

In the preparation of trans-8-trans-10-dodecadien-1-ol (XII), a monoalkyl ester of azelaic acid, suitably the methyl ester (I), is prepared by esterifying azelaic acid with the appropriate alkanol, suitably a lower alkanol such as methanol. The ester (I) is converted to an alkyl-8-bromooctonate, by a Hunsdiecker reaction, or, preferably by the action of bromine in the presence of red mercuric oxide in the absence of light. The action of an appropriate oxidizing agent in the presence of a mild base upon the alkyl 8-bromooctanoate (II), suitably pyridine-N-oxide in the presence of sodium bicarbonate yields the corresponding alkyl 8-oxooctanoate (III).

Compound (III) may then be treated with one of two Wittig reagents. Reaction with 1-triphenylphosphoniumtrans-2-butene bromide (IV), prepared from trans-crotyl bromide and triphenylphosphine, with the alkyl 8-oxooctanoate (III) yields cis, trans-8-trans-10-dodecadienoic acid (V). The acid (V) is then reduced to the corresponding alcohol, suitably by means of an organometallic reducing agent such as lithium aluminum hydride or sodium dihydro-bis 2-(methoxy ethoxy) aluminate, yielding cis, trans-8-trans-10-dodecadien -1-ol which is converted to the desired trans-8-trans-10-dodecadien-1-ol (VII) by treatment with a mild free radical source such as ultraviolet light or iodine in the presence of sunlight. The non-favored isomers may be produced in the following manner.

But-2-yn-1-ol is reacted with a suitable halogenating agent, preferably brominating agent, for example, phosphorous tribromide to yield the corresponding 1-bromo-2-butyne (XIII) which is reacted with triphenyl phosphine in the usual manner to yield the corresponding Wittig reagent (XIV) which is then reacted with an alkyl, suitably methyl 8-oxooctanoate in the manner described hereinabove, to yield the corresponding cis, trans-8-dodecen-10-ynoic acid (XV) which is then hydrogenated using a Lindlar catalyst to yield cis, trans-8-cis-10-dodecadienoic acid which is then reduced to the corresponding 1-hydroxy compound (XVII). This mixture is esterified, suitably acetylated, and the isomeric fractions separated, suitably by thin layer chromatography. The corresponding fractions are then separated to yield trans-8-cis-10-dodecadien-1-ol acetate as the major fraction from which the free alcohol (XVIII) is isolated in the usual manner.

The cis-8-trans-10-dodecadien-1-ol is prepared in the following manner:

An alkyl, suitably methyl 8-bromooctanoate, is converted into the corresponding Wittig reagent (XIX) by reaction with triphenylphosine in the usual manner. The reagent (XIX) is then reacted with trans-crotonaldehyde in the presence of a base to yield cis-8-trans-10-dodecadienoic acid (XX) which is then reduced with an organometallic reducing agent in the manner described hereinabove to yield cis-8-trans-10-dodecadien-1-ol. (XXI)

Cis-8-cis-10-dodecadien-1-ol (XXV) is prepared as follows:

2-Butyn-1-ol is oxidized to 2-butynal (XXII) suitably by treatment with manganese dioxide and the resultant aldehyde treated with the Wittig reagent (XIX) in the presence of a base to yield cis-8-dodecen-10-ynoicacid (XXIII) which is then reduced in the aforementioned manner to the corresponding 1-alcohol (XXIV). Hydrogenation in the presence of a Lindlar catalyst yields a product consisting substantially of cis-8-cis-10-dodecadien-1-ol.

The convertability of the non-favored isomers to the trans, trans form may be demonstrated by the following reaction sequence.

2-Butyn-1-ol is hydrogenated in the presence of a Lindlar catalyst to yield cis, trans-2-buten-1-ol (VIII). The hydroxy group is replaced by a halogen, suitably bromine by treatment with a brominating agent, suitably phosphorous tribromide, to yield 1-bromo-cis, trans-2-butene (IX), which upon reaction with triphenyl phosphine in the usual manner yields the Wittig reagent 1-triphenylphosphonium-cis, trans-2-butene bromide (X) which is then reacted with the alkyl suitably methyl 8-oxooctanoate (III) prepared as above to yield the corresponding cis, trans-8-cis, trans-10-dodecadienoic acid (XI). The acid is reduced, suitably in the manner described above, to yield the corresponding cis, trans-8-cis, trans-10-dodecadien-1-ol (XII) which, upon treatment with a mild free radical source such as iodine in the presence of sunlight, yields the desired trans-8-trans-10-dodecadien-1-ol (VII).

Schemes of Reaction Sequences

I. trans-8, trans-10-dodecadien-1-ol

II. trans-8, cis-10-dodecadien-1-ol

 (XIII)

 (XIV)

HOC(CH$_2$)$_6$CO$_2$CH$_3$, DMF, NaOMe

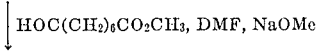 (XV) (XVI)

"Red-Al"®—

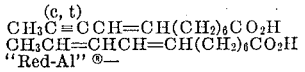 (XVII)

purified by TLC, using the acetate

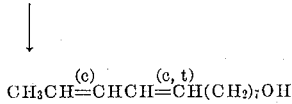 (XVIII) (XXV)

III. cis-8, trans-10-dodecadien-1-ol

Br(CH$_2$)$_7$CO$_2$CH$_3$

φ$_3$P

Brφ$_3$P(CH$_2$)$_7$CO$_2$CH$_3$ (XIX)

CH$_3$CH=CHCHO, DMF, NaOMe

CH$_3$CH=CHCH=CH(CH$_2$)$_6$CO$_2$H (XX)

"Red-Al"®

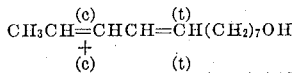 (XXI)

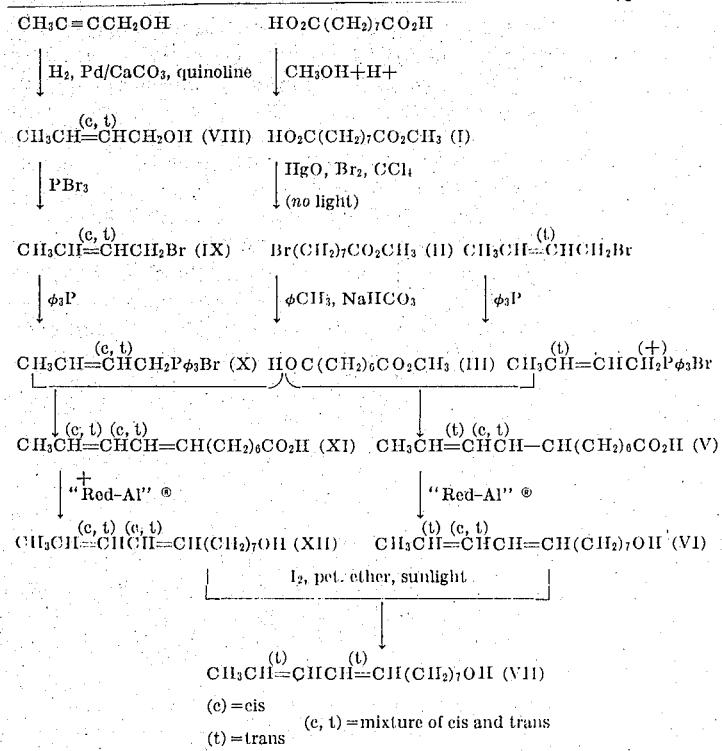

(c) = cis
(t) = trans
(c, t) = mixture of cis and trans

IV. cis-8, cis-10-dodecadien-1-ol

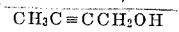

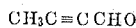

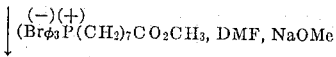 (XXII)

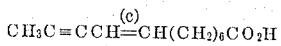

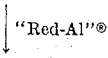 (XXIII)

"Red-Al"®

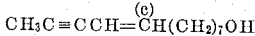 (XXIV)

$H_2$, Pd/CaCO$_3$, quinoline

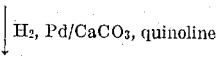 (XXV)

The biological efficacy of the synthetic materials was tested both by field test and by electro-antennograms. The electro-antennograms were run by a modification of the method and apparatus of Schneider (First Int. Simp. on Olfaction and Taste, Oxford, (1963), page 85). In this test, antenna of the insect which had been prepared in the method described by Schneider and had been attached to an oscilloscope, were exposed to an air stream into which were injected 1 ml. puffs passing over a piece of filter paper saturated with a small amount of the chemical material under test. The electrical responses of the antennae were measured on the oscilloscope. By this means, it was found that by far the greatest response of electrical activity of the antennae was obtained from the natural pheromone extract and the synthetic trans-8-trans-10-dodecadien-1-ol.

In the field tests, Sectar insect traps (3M Company) were charged with the material under test and hung in fields where the moth was prevalent.

METHOD OF EAG MEASUREMENT

EAG recordings are obtained from excised codling moth (CM)(L.pomonella) antenna (ca. 3 mm long). The antennal socket is pressed against the wet surface of a wax block in a Syracuse watch glass full of insect Ringer solution. The solution was prepared from 20 g. potassium chloride, 10 g. sodium chloride, 7.5 g. calcium chloride, 0.02 g. magnesium chloride, and 0.02 g. sodium dihydrogen phosphate in 2 l. water - finally adjusted to pH 6.9. A microscope at 12X magnification is used to observe the snipping of several distal antennal segments. The cut end is brought in loose contact with the liquid surface of a glass capillary filled with Ringer. The capillary is permanently mounted with wax on the input probe ($10^{12}$ ohms impedance) of an EL-SA-3 (Electronics for Life Sciences, Rockville, Md.) DC pre-amplified, the output of which is fed to a 200X amplifier and then to a Tektronix model 564 storage oscilloscope. The probe and capillary are carried by a Narishige MM33 micromanipulator. Electrical contact is made between the probe and the capillary with a short piece of chloridized silver wire. The ground lead from the probe contacts another chloridized silver wire dipped into the silane of the watch glass (short leads are used to avoid picking up extraneous electrical signals). The oscilloscope trace is either photographed or measured directly. All the instruments, except the oscilloscope, are located inside a grounded Faraday cage made of one-fourth in. mesh galvanized wire, which screens out extraneous electrical signals.

Air, taken from the building air supply, is filtered through fiberglass, anhydrous calcium sulphate, activated charcoal, a Koby air purifier and finally rehumidified through distilled water. The air passes through 1 cm$^2$ glass tubing that terminate 2 cm from the fixed antenna. Air contaminated with test chemicals is exhausted through a small hood located directly behind the working area. A short 2 mm. I.D. capillary tube is affixed through a hole in the glass tubing close to the outlet at the air stream to provide an inlet port for injection of test chemicals into the air stream.

A measured amount of test chemical, generally in petroleum ether is placed on 0.7 cm$^2$ of filter paper and the paper inserted inside a Pasteur pipet after solvent evaporation. Test pipets containing chemicals with a molecular weight above 200 were found to be good for many months if stored in −20°C between uses. The pipets, warmed to room temperature, are attached via their large end to a glass syringe equipped with a small cork adapter on the needle. A measured volume of air is drawn into the syringe before attaching the pipet. The pipet tip is inserted through the capillary inlet port in the air stream and the syringe plunger quickly depressed to pass the measured volume of air through the pipet and into the air stream as a "puff" containing test chemical. The usual injection of 1 ml. of air into an air stream of 1,500 ml./sec. caused very little change in the background trace. An injection of 5 ml. of air through a blank pipet produces a maximum of 0.1 mV deflection for normal preparations. Minor variations in the volume injected or in the duration of the air puff have little measurable effect on the size and shape of the resulting EAG. The duration of a 1 ml. air puff from a 5 ml. syringe is 30–35 milliseconds (measured by sending an air puff into a sensitive microphone and displaying the noise on an oscilloscope) and its reproducibility is good. The CM antenna recovers to its initial state in 1 to 3 seconds after a test, as indicated by return of the trace to baseline. An interval of about 10 seconds between tests is used routinely. It should be pointed out that EAG amplitude comparisons are subject to error because some chemicals are more volatile than others and may have more molecules in each puff. The most accurate comparisons are made between a series of positional or geometrical isomers with identical molecular weights.

An antenna from a moth anesthesized with ether displays only 80 microvolts of random noise and does not react to test chemicals. As the antenna recovers, the normal "nerve noise" due to nerve cell activity reappears (generally ca. 500 microvolts in a fresh CM antenna preparation). Antennae of small tortricids produce much more noise than antennae of larger species of moths, although it is still possible to record a 100 microvolt response since the noise is a mixture of higher frequencies than the signal. Washing CM antennae with Beadle-Ephrussi saline of Ringers for as long as 30 minutes has no marked effect on the EAG amplitude if the antenna is rinsed with distilled water, blotted and dried one minute before being excised and tested.

EAG Results

The EAG response in millivolts was plotted against the log of the dosage of test compound applied to the filter paper. These results are shown in FIG. I.

These results indicate that the trans, trans isomer is the most active isomer, at low dosages it is more active by a factor of about 2 over the next most active isomer. This activity is not proof of pheromone activity, although it is indicative of good biological activity with the males.

Trapping Tests

1 μl samples were placed in a rubber septum which was inserted into a Sectar trap, (3M Company). The trap was hung in a field infested with codling moths. After one day the traps showed the following content:

| (1) | Trans-8-trans-10-isomer (from Example VII) | 19 males |
| (2) | Cis, trans-8-trans-10- mixture (from Example VI) | 15 males |
| (3) | Trans-8-cis-10-isomer (from Example XIX) | 0 |

1 μl samples were obtained from glc separation of the product of Example XII and field tested as above:

| (1) | 1st peak composition (cis-8-trans-10-isomer) | 3 males |
| (2) | 2nd peak composition (mixture of cis-8-cis-10-isomer, trans-8-trans-10-isomer and trans-8-cis-10 isomers) | 21 males |

A mixture of the synthetic isomers (Example XII) was acetylated and separated by thin layer chromatography on a silver nitrate impregnated silica gel plate developed with benzene. The top, middle and bottom sections of the plate were scraped off, hydrolyzed and placed in a Sector trap on dental wicking.

The hydrolyzed scrappings were divided to three parties with the following correspondence:

| top: | trans-8-trans-10 | ) |
| middle: | cis-8-cis-10 | ) ISOMERS |
|  | trans-8-cis-10 | ) |
| bottom: | cis-8-cis-10 | ) |

The scrappings were placed in the traps as previously:

| top (trans, trans) | 11 males |
| middle (cis, trans and trans, cis) | 0 |
| bottom (cis, cis) | 0 |

A comparative test of the efficacy of the trans-8-trans-10-isomer vis a vis live females was carried out by placing traps containing 10 live females in each of three corners of a large cage and a trap containing 40 μg of the trans, trans isomer in the fourth corner. 800 males released into the case.

| live female traps | (1) | 0 |
|  | (2) | 4 males |
|  | (3) | 18 males |
| Synthetic trap |  | 41 males |

The attractant substance may be used per se. In order to obtain more accurate dispensing of the attractant it may be taken up in a suitable volatile diluent. Any reaction inert volatile organic solvent may be employed. Lower alkanols such as methanol or ethanol, ethers such as diethyl ether, halogenated hydrocarbons such as methylene chloride and alkyl ketones such as acetone or the like may be employed.

These solvents will evaporate very rapidly leaving the attractant in the trap which may then volatilize slowly.

The rate of volatilization may be reduced by dissolving the attractant in a substantially non-odorous viscous liquid. The nature of this viscous liquid is not critical, however olive oil has been found suitable as an attractant keeper, as have glycerol trioctanoate, mineral oil and Nujol. The use of such keepers permits the raising of dosage per trap to about 10,000 μg. This permits the traps to be active for a longer time without creating the repulsant effect noted with high concentrations of sex attractants.

It will be seen therefore, that the preparation of compositions of the attractant, a keeper, and a diluent is most desirable. The concentration of the components is not critical as the determining factor is the amount dispensed per trap. Thus, where a 1 ml. sample comprising 10 mg is to be dispensed per trap, a suitable composition would be as follows:

| trans-8-trans-10-dodecadien-1-ol | 10 g. |
| Olive Oil | 100 ml. |
| Ethanol | 900 ml. |

EXAMPLE I

Monomethyl ester of azelaic acid (I)

Azelaic acid (400 g., 2.13 moles; Eastman technical grade), methanol (120 ml.), and concentrated hydrochloric acid (120 ml., 36 percent) were mixed and refluxed overnight. Distillation under reduced pressure removed unreacted methanol and aqueous acid, then dimethyl azelate (μ77 g., b.p. 109–144° at 0.2–0.7 mm Hg) and finally monomethyl azelate (I); 178 g., b.p. 144–164°/0.2 mm Hg. In accordance with the foregoing procedure but where in place of methanol, there is used ethanol, propanol or butanol, there is obtained the corresponding ethyl, propyl or butyl azelate.

EXAMPLE II

Methyl 8-bromooctanoate (II)

Monomethyl azelate (60 g., 0.30 moles), red mercuric oxide (120 g., 0.55 moles), and carbon tetrachloride (1 l.) were mixed and heated to reflux. The reaction flask was wrapped to exclude light, and bromine (72 g., 0.45 moles) in carbon tetrachloride (350 ml) was added slowly. The mixture was refluxed and stirred for 2 hours, then filtered and evaporated. To remove residues of mercury salts, the filtrate was diluted with petroleum ether (30–60°) and extracted sequentially with several portions each of distilled water, dilute nitric acid, and again distilled water. Filtration of the organic layer through a pledget of anhydrous magnesium sulfate and evaporation of filtrate produced a material of satisfactory purity for the next reaction. IR, 1745 cm$^{-1}$, glc, one major peak and several minor ones comprising a total of ca 5 percent of the mixture. Distillation yielded 84 g. (100 percent) of methyl 8-bromooctanoate (II), b.p. 105–112° at 3–5 mm Hg.

In accordance with the foregoing procedure but where, in place of methyl azelate, there is used ethyl, propyl or butyl azelate, there is correspondingly produced ethyl, propyl or butyl 8-bromooctanoate.

EXAMPLE III

Methyl 8-oxooctanoate (III)

Methyl 8-bromooctanoate (84 g., 0.29 moles), pyridine-N-oxide (55 g., 0.58 moles), sodium bicarbonate (49 g., 0.58 moles), and toluene (500 ml) were mixed and refluxed under nitrogen for 4 hours. The mixture was cooled and poured into water (2 l.). The organic layer was separated and the aqueous phase was extracted twice with petroleum ether (30–60°). The combined organic layers were evaporated and the residue was distilled to yield methyl 8-oxooctanoate (III) 53 g. (85 percent), b.p. 102°– 122° at 1–5 mm Hg; IR 2730, 1745 cm$^{-1}$, glc (Hi-Eff column) one major peak and one very minor peak.

In accordance with the foregoing procedure but where, in place of methyl 8-bromooctonate, there is utilized ethyl, propyl or butyl octanoate, there is obtained the corresponding alkyl 8-oxooctanoate.

EXAMPLE IV

1-Triphenylphosphonium-trans-2-butene bromide (IV)

trans-Crotyl bromide (11.2 g., 0.083 moles); triphenyl phosphine (23 g., 0.888 moles); and benzene (60 ml.) were mixed and refluxed under nitrogen for 0.5–1 hour. The mixture was cooled and filtered. The solids were washed on the filter with benzene and diethyl ether, then dried under vacuum over phosphorus pentoxide, to yield 1-triphenylphosphonium-trans-2-butene bromide (IV) 26.4 g. (80 percent) which was used without further purification.

In accordance with the foregoing procedures but where, in place of methyl 8-oxooctanoate, there are utilized any of the other alkyl 8-oxooctanoates produced in accordance with Example III, there is obtained the same product.

EXAMPLE V cis, trans-8, trans-10-Dodecadienoic acid (V)

Dimethylformamide was dried over molecular sieve 4A (Linde Division, Union Carbide). 1-Triphenylphosphonium-trans-2-butene bromide (IV) (26.0 g., 0.65 moles) was dissolved in dry dimethylformamide (500 ml.) and placed under nitrogen. Addition of sodium methoxide (29.5 g., 0.5 moles) produced a dark red color. The reaction mixture was stirred for 1–2 hours, cooled in an ice-water bath, and methyl 8-oxooctanoate (III) (8.55 g., 0.0050 moles) in dry dimethylformamide (200 ml.) was added slowly. The reaction was left overnight at room temperature and poured into 5–10 times its volume of cold water. The mixture was extracted three times with petroleum ether (30°–60°), then once with diethyl ether, once with benzene and once again with diethyl ether. The aqueous phase was acidified with aqueous hydrochloric acid and extracted three times with petroleum ether (30°–60°). The first and second petroleum ether extracts were each separately washed at least three times with aqueous sodium chloride, filtered through anhydrous sodium sulfate and evaporated. The first extract contained the methyl ester of -cis, trans-8-trans-10-dodecadienoic acid which was saponified with sodium hydroxide and ethanol. This reaction product was worked up in the same manner as the original reaction mixture and the contents of the petroleum ether extracts of the acidified reaction mixture were added to the second original petroleum ether extract. This material was essentially free of triphenyl phosphine or triphenyl phosphine oxide. Evaporation of the solvent yielded cis, trans-8-trans-10-dodecadienoic acid (V) 6.6 g. (68 percent), IR, 3030, 2700, 1715, 995, 950 $cm^{-1}$.

EXAMPLE VI cis, trans-8, trans-10-Dodecadien-1-ol (VI)

"Red-Al (40 ml., 28 g., 0.14 moles); being a 70 percent solution in benzene of sodium bihydro-bis-2-(methoxy ethoxy) aluminate, was placed in a flask under nitrogen. Cis-trans-8-trans-10-dodecadienoic acid (VI) (6.6 g., 0.034 moles) in benzene (50 ml.) was added slowly. The mixture was heated under reflux for 1 hour, cooled, 2 percent sodium hydroxide (100 ml.) added dropwise under nitrogen and extracted three times with petroleum ether (30°–60°). The combined extracts were washed with aqueous sodium chloride until neutral, filtered through anhydrous magnesium sulfate and evaporated to yield crude cis, trans-8-trans-10-dodecadien-1-ol, 8.24 g. (theoretical = 6.13 g); IR, 3350, 3030, 995 and 950 $cm^{-1}$; glc (Hi-Eff column) shows two peaks, roughly 20 and 80 percent of the mixture, with the smaller peak having a retention of 0.93 relative to the larger peak; glc (Apiezon-L capillary) of the acetylated mixture shows only two peaks, roughly 25 percent (cis-8, trans-10) and 75 percent (trans-8, trans-10) of mixture.

EXAMPLE VII trans-8, trans-10-Dodecadien-1-ol (VII)

cis, trans-8-trans-10-dodecadien-1-ol (VI) 1 g. was taken up in petroleum ether (50 ml; 30°–60°) plus ~0.1N iodine in petroleum ether (1–5 ml.) and exposed to sunlight in a stoppered flask for 5 days. The solution was decanted from a yellow oily deposit and evaporated to yield ca 0.4 g. The infrared spectrum and gas chromatogram of the preparations show IR, 3350, 3030, 995 (very strong) and 955 (weak) $cm^{-1}$, U.V., λmax 227.5 mμ (E ~ 25,000); glc (Hi-Eff column) shows two peaks comprising 10 and 90 percent of the mixture. The small peak was cis-8, trans-10-dodecadien-1-ol, which has a retention on the Hi-Eff column relative to trans-8-trans-10-dodecadien-1-ol (VII) of 0.93.

A chromatogram of the acetylated mixture on an Apiezon-L capillary column showed only these two isomers. These isomers are also separable, as their acetates, on three layers of silver nitrate impregnated silica gel-G.

EXAMPLE VIII cis, trans-2-Buten-1-ol (VIII)

Methanol (60 ml.), 5 percent palladium on calcium carbonate (0.5 g.), and quinoline (0.5 g.) were mixed and stirred under hydrogen. When the catalyst turned black, 2-butyn-1-ol (10.6 g., 0.29 moles;) was injected into the reaction flask. Hydrogen uptake (7.30 l. theoretical = 7.28 l.) proceeded at the rate of 1 l./30–40 min., upon completion of hydrogen uptake the reaction mixture was filtered.

The filtrate was distilled, the portion distilling at <70° was discarded, and the remainder was distilled at slightly reduced pressure to yield cis, trans-2-butene-1-ol (VIII), 17.4 g. (84 percent); IR. 3030, 1655 $cm^{-1}$ and a band at 980 $cm^{-1}$ indicated the presence of a considerable amount of the trans-isomer of (V), glc. showed some methanol remained.

EXAMPLE IX 1-bromo-cis, trans-2-Butene (IX)

cis, trans-2-buten-1-ol (VIII) prepared in Example VIII) (15.9 g., 0.22 moles) and petroleum ether (50 ml.) were mixed, placed in a nitrogen atmosphere and cooled in an ice-salt bath (−15° to −20°). Phosphorus tribromide (46.2 g., 0.17 moles;) in petroleum ether (50 ml.) was added slowly, and the temperature kept at −10° to −20° for 2 hours. The reaction was allowed to warm slowly and was kept at room temperature overnight. The reaction mixture was poured over an ice-water mixture and extracted three times with petroleum ether (30°–60°). The combined extracts were washed with aqueous sodium bicarbonate, then with aqueous sodium chloride, filtered through anhydrous sodium sulfate and distilled at atmospheric pressure until the temperature of the distillate reached 55°. The residue was distilled under vacuum (water pump) to yield 15.3 g. of 1-bromo-cis, trans-2-butene (IX); IR shows no alcohol peak; glc shows only one peak with the same retention on a Hi-Eff column as commercial trans-crotyl bromide.

EXAMPLE X

1-Triphenylphosphonium-cis, trans-2-butene bromide (X)

In accordance with the procedure of Example IV, but starting with 1-bromo-cis, trans-2-butene (IX) (11 g., 0.09 moles) and benzene (60 ml.), there is obtained 1-triphenylphosphonium-cis, trans-2-butene bromide (X), 26 g. (80 percent).

EXAMPLE XI cis, trans-8-cis, trans-10-Dodecadienoic acid (XI)

In accordance with the procedure of Example V but using triphenyl phosphonium-cis, trans-2-butene bromide (X), (24.3 g., 0.061 moles), dimethyl formamide (500 ml. + 200 Ml.), sodium methoxide (30.6 g., 0.57 moles) and methyl 8-oxooctanoate (III) (8.2 g., 0.48 moles), there was obtained cis, trans18-cis, trans-10-dodecadienoic acid (XI), IR was essentially the same as that of cis, trans-8-trans-10-dodecadienoic acid (V).

EXAMPLE XII cis, trans-8-cis, trans-10-dodecadien-1-ol (XII)

In accordance with the procedure of Example VI but starting with cis, trans-8-cis, trans-10-dodecadienoic acid (XI) (3.8 g., 0.019 moles), "Red-Al" (20 ml. 14 g., 0.069 moles) and benzene (35 ml.), there is obtained cis, trans-8-cis, trans-10-dodecadien-1-ol, 5.0 g. (theoretical = 3.5 g.), IR, is the same as that of (VI), glc. (Hi-Eff. column) shows two peaks, roughly 25 percent and 75 percent of the mixture, with the smaller peak having a retention of 0.93 realtive to the larger peak, glc (Apiezon-L capillary) of the acetylated mixture shows 4 peaks. In their order of elution, the roughly estimated proportion of each in the mixture is 10 percent (cis-8, trans-10), 3 percent (cis-8, cis-10), 57 percent (trans-8, trans-10), and 30 percent (trans-8, cis-10).

EXAMPLE XIII trans-8, trans-10-Dodecadien-1-ol (VII)

cis, trans-8-cis, trans-10-dodecadien-1-ol (XII) ig. was taken up in petroleum ether (50 ml., 30°–60°) plus 0.1N iodine in petroleum ether (1–5 ml) and was exposed to sunlight in stoppered flasks for 5 days. The solution was decanted from a yellow oily deposit and evaporated to yield ca 0.4 g. The infrared spectra and gas chromatogram of the preparations are indistinguishable from those of the preparation of Example (VI) supra. IR. 3350, 3030, 995 (very strong) and 955 (weak) cm$^{-1}$; U.V., λmax 227.5 mμ (E~25,000); glc (Hi-Eff column) shows two peaks comprising 10 and 90 percent of the mixture. The small peak was cis-8-trans-10-dodecadien-1-ol, which has a retention on the Hi-Eff column relative to cis-8-trans-10-dodecadien-1-ol (XXI) of 0.93.

A chromatogram of the acetylated mixture on an Apiezon-L capillary column showed only these two isomers. These isomers are also separable, as their acetates, on thin layers of silver nitrate impregnated silica gel-G.

EXAMPLE XIV

1-Bromo-2-butyne (XIII)

In accordance with the procedure of Example IX but starting with 2-butyn-1-ol (17.4 g., 0.25 moles), petroleum ether (200 ml., 30°–60°), and phosphorus tribromide (50 g., 0.18 moles); there is obtained crude 1-bromo-2-butyne (XIII) 15.2 g. (47 percent), IR. 2250 (strong) cm$^{-1}$, with no peaks in the OH stretching region.

EXAMPLE XV

1-Triphenyl phosphonium-2-butyne bromide (XIV)

In accordance with the procedure of Example IV, but using 1-bromo-2-butyne (XIII) (15 g., 0.11 moles), triphenyl phosphine (41 g., 0.16 moles) and benzene (100 ml.), there is obtained 1-triphenyl phosphonium-2-butyne bromide (XV) which was dissolved in dry dimethyl formamide and kept over molecular sieve Type 4A.

EXAMPLE XVI cis, trans-8-dodecen-10-ynoic acid (XV)

In accordance with the procedure of Example V, but utilizing the solution prepared in Example XV, (max. of 45 g., 0.11 moles), (II) (17 g., 0.99 moles), sodium methoxide (39 g., 0.72 moles) and dimethyl formamide (~500 ml.) there is obtained crude cis, trans-8-dodecen-10-ynoic acid (XV), 5 g. (26 percent, based on the aldehyde); IR, 3030, 2680, 2230, 1715, 960 cm$^{-1}$.

EXAMPLE XVII cis, trans-8, cis-10-dodecadienoic acid (XVI)

In accordance with the procedure of Example VIII but utilizing cis, trans-8-dodecen-10-ynoic acid (XV) obtained in Example XVI, ethanol, quinoline, and 5 percent palladium on calcium carbonate previously treated with lead tetraacetate, there was obtained upon hydrogenation at atmospheric pressure crude cis, trans-8-cis-10-dodecadienoic acid (XVI). ir: 3030, ~ 2600, 1715, 990 and 955 cm$^{-1}$.

EXAMPLE XVIII cis, trans-8, cis-10-dodecadien-1-ol (XVII)

In accordance with the procedure of Example VI, the product of Example XVII, cis, trans-8-cis-10-dodecadienoic acid (XVI) is taken up in benzene and reduced with "Red-Al". The reaction product showed infrared peaks at 3350, 3030, 990 (weak), and 955 (weak) cm$^{-1}$; glc (Hi-Eff column) showed two peaks: the smaller peak (XXI; 5 percent) had a retention relative to the larger peak (XVII; 95 percent) of 0.93, and XVII had a retention relative to VII of 1.0.

The reaction product was purified by collection from a Hi-Eff column on a preparative scale. This reduced the amount of (XXV) in the preparation to <2 percent.

EXAMPLE XIX trans-8, cis-10-dodecadien-1-ol (XVIII)

cis, trans-8-cis-10-dodecadien-1-ol collected from the gas chromatogram in accordance with Example XVIII was mixed with a large excess of acetyl chloride and left at room temperature for 1–2 hours, the excess acetyl chloride was then evaporated in a stream of dry nitrogen. The residue was diluted with petroleum ether (30°–60°), washed once with aqueous sodium bicarbonate and twice with aqueous sodium chloride, dried over anhydrous magnesium sulfate and evaporated. The residue was chromatographed on thin layers of silver nitrate impregnated silica gel-G using benzene as eluent. Two areas were visualized with 2,7-dichlorofluoroescein, removed and eluted with diethyl ether. Each residue was treated with excess sodium hydroxide in ethanol at near reflux for one hour, then diluted with petroleum ether (30°–60°), washed with aqueous sodium chloride, dried over anhydrous magnesium sulfate and evaporated to leave trans-8-cis-10-dodecadien-1-ol (XVIII) (from the fastest-running TLC area); IR 3350, 3030 (strong), 985 (strong), and 950 (strong) cm$^{-1}$; u.v. (in petroleum ether), 230.0 m$\mu$ (E~25,000), and cis-8-cis-10-dodecadien-1-ol (XXV) (from the slowest-running TLC area); IR, 3350, 3030 (weak, one of a multiplet), 985 (weak) and 950 (weak); u.v. (in petroleum ether), 2325 m$\mu$ (E~25,000). Each also has the same retention time on Hi-Eff as (VI).

EXAMPLE XX

Methyl 8-triphenyl phosphonium octanoate bromide (XIX)

Methyl 8-bromooctanoate (20 g., 0.11 moles), triphenyl phosphine (30 g., 0.11 moles), and benzene (ca 15 ml.) were mixed and refluxed for 2 days. The cooled reacton mixture was washed in the flask with one portion of benzene and several portions of dry ether to remove unreacted starting materials. Most of the residual solvent was evaporated, the residue dissolved in dry dimethyl formamide and stored over molecular sieve 4A until used in the next stage.

EXAMPLE XXI cis-8, trans-10-dodecadienoic acid (XX)

In accordance with the procedure of Example V but starting with the solution of methyl 8-triphenyl phosphonium octanoate bromide (XIX) prepared in Example XX (maximum of 42 g., 0.084 moles), sodium methoxide (12.4 g., 0.23 moles), dry dimethyl formamide (250 ml.), and trans-2-butenal ("trans-crotonaldehyde;" 5.6 g., 0.080 moles); there was obtained cis-8-trans-10-dodecadienoic acid (XX). (6.8 g., (41 percent), IR, 3030, 2690, 1715, 990, and 955 cm$^{-1}$.

EXAMPLE XXII cis-8, trans-10-dodecadien-1-ol (XXI)

cis-8, trans-10-dodecadienoic acid (XX) (6.8 g., 0.035 moles) was reduced in accordance with the procedure of Example VI using "Red-Al" (30 ml., 21 g., 0.10 moles), and benzene (50 ml.). There is obtained a crude yield product 4.9 g. (78 percent), IR, 3350, 3030, 1660, 990, 995 cm$^{-1}$. glc. (Hi-Eff column), shows two peaks comprising roughly 75 percent and 25 percent of the mixture, with the major peak having a retention of 0.92 relative to the minor peak, which in turn had a retention relative to (VII) of 1.0. Collection of this preparation from a Hi-Eff column on a preparative scale increased the amount of cis-8-trans-10-dodecadien-1-ol (XX) in the isomer mixture to ca 90 percent. The ultraviolet spectrum of (XXI) in petroleum ether has 80 max 230.0 m$\mu$ (E~25,000).

EXAMPLE XXIII

2-Butynal (XXII)

2-Butyn-1-ol (1.5 g., 0.021 moles); freshly prepared manganese dioxide (15.2 g.; 0.18 moles), and petroleum ether (30°–60°) were mixed and stirred at room temperature for 4 hours. The mixture was filtered and the clear filtrate containing 2-butynal (XXIII) was used directly in the next reaction. The infrared spectrum of this material showed bands at 2740, 2220, and 1685 cm$^{-1}$.

EXAMPLE XXIV cis-8-dodecen-10-ynoic acid (XXIII)

In accordance with the procedure of Example V, methyl 8-triphenyl phosphonium octanoate bromide (XIX), prepared from 3.68 g. of methyl 8-bromooctanoate; 0.016 mols, is reacted with sodium methoxide (4.1 g., 0.076 moles), dry dimethyl formamide (~100 ml.), and the solution of 2-butynal (XXII) prepared in Example XXIII (maximum of 0.021 moles). The reaction mixture was a 2-phase system but otherwise the reaction proceeded no differently from those carried out entirely in dimethyl-formamide. There is obtained cis-8-dodecen-10-ynoic acid (XXIII) 1.07 g. (35%); IR, 3030, 2690, 1715 cm$^{-1}$, with no peaks at 995 and 950 cm$^{-1}$.

EXAMPLE XXV cis-8-dodecen-10-yn-1-ol (XXIV)

In accordance with the procedure of Example VI, cis-8-dodecen-10-ynoic acid (XXIII) (0.56 g., moles) was reduced with "Red-Al" (5 ml., 3.5 g., 0.017 moles), and benzene (35 ml.). There was obtained crude cis-8-dodecen-10-yn-1-ol (XXIV) (0.57 g.); IR, 3350, 3030, 2220 cm$^{-1}$, with no peaks in the carbonyl region; glc (Hi-Eff column) showed on peak with the expected retention for XXIV, as well as several other significant peaks. This preparation was used without further purification in the final reaction.

EXAMPLE XXVI cis-8, cis-10-dodecadien-1-ol (XXV)

In accordance with the procedcure of Example VIII, crude cis-8-dodecen-10-yn-1-ol (XXIV) obtained from Example XX was hydrogenated using as a catalyst a preparation of 5 percent palladium on calcium carbonate that had been previously treated with lead tetraacetate (0.1 g.), quinoline (0.1 g.), ethanol (25 ml.). Hydrogen take up was less than theoretical. (theoretical, 76 ml.; actual, 24 ml.). Work-up yielded cis-8-cis-10-dodecadien-1-ol (XXV) 0.22 g. (42 percent), IR, 3350, 3030, and only very weak bands at 990 and 950 cm$^{-1}$; glc (Hi-Eff column) showed two peaks in the area where (XXV) is expected in the approximate ratio of 1:4, with the smaller peak (XXI) having a retention of 0.93 with respect to the larger peak (XXV). The product was purified by collection from a Hi-Eff column on a preparative scale. The purified product (XXV) had the approximate composition: 1 percent of (XXIV), 89 percent of (XXV) and 10 percent of (XXI); u.v., (in petroleum ether) $\lambda$max. 232.5 m$\mu$ (E~25,000).

The attractant product of the present invention may be used in a variety of insect traps Sector Traps (3M Mfg. Co.) have been found most suitable. The attractant is placed in a rubber septum in the trap, which is hung in infested areas. The amount of attractant in the trap may vary from about 1 $\mu$g – 10,000 $\mu$g, preferably from about 30 μg to about 2,000 μg. Tests comparing the attractivity of a 40 μg sample of the attractant to the secretion of 10 live females per trap, showed that the synthetic attractant at that level was from 10–2 times more potent than the live females.

We claim:

1. A method of attracting and trapping males of the species Laspeyresia pomonella, which comprises charging an insect trap with from about 1 to about 10,000 μg per trap of trans-8-trans-11-dodecadien-1-ol, and placing said trap in an area infested with *Laspeyresia pomonella*.

2. A method according to claim 1 wherein there is charged from about 30 – 2,000 μg per trap of trans-8-trans-10-dodecadien-1-ol.

* * * * *